United States Patent
Varadarajan

(10) Patent No.: US 10,235,712 B1
(45) Date of Patent: *Mar. 19, 2019

(54) GENERATING PRODUCT IMAGE MAPS

(71) Applicant: Amazon Technologies, Inc., Reno, NV (US)

(72) Inventor: Anand Varadarajan, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1361 days.

This patent is subject to a terminal disclaimer.

(21) Appl. No.: 14/230,751

(22) Filed: Mar. 31, 2014

Related U.S. Application Data

(63) Continuation of application No. 12/842,088, filed on Jul. 23, 2010, now Pat. No. 8,706,572.

(51) Int. Cl.
*G06Q 30/00* (2012.01)
*G06Q 30/06* (2012.01)

(52) U.S. Cl.
CPC .................. *G06Q 30/0641* (2013.01)

(58) Field of Classification Search
CPC ..... G06Q 30/00; G06Q 40/00; G06Q 30/0641
See application file for complete search history.

(56) References Cited

U.S. PATENT DOCUMENTS

| 7,000,242 | B1 * | 2/2006 | Haber | G06F 17/30274 715/719 |
|---|---|---|---|---|
| 7,315,830 | B1 | 1/2008 | Wirtz et al. | |
| 7,319,981 | B2 | 1/2008 | Schwartzman | |
| 7,418,411 | B2 | 8/2008 | Schwartzman | |
| 7,418,412 | B2 | 8/2008 | Schwartzman | |
| 2002/0005909 | A1 | 1/2002 | Sato | |
| 2002/0138374 | A1 | 9/2002 | Jennings et al. | |
| 2004/0017944 | A1 * | 1/2004 | Ding | G06K 9/4609 382/182 |
| 2004/0044587 | A1 | 3/2004 | Schwartzman | |
| 2005/0055281 | A1 | 3/2005 | Williams | |
| 2007/0150403 | A1 * | 6/2007 | Mock | G06Q 30/08 705/37 |
| 2008/0086388 | A1 | 4/2008 | Schwartzman | |
| 2009/0216549 | A1 * | 8/2009 | Causey | G06Q 30/02 705/26.1 |
| 2010/0034468 | A1 | 2/2010 | Boncyk et al. | |
| 2010/0260426 | A1 * | 10/2010 | Huang | G06F 17/30247 382/218 |

(Continued)

OTHER PUBLICATIONS

No Author, " Make your vote count! It's time to choose the year's best new products", New Equipment Digest, v78, n2 p32(1), Feb. 2013. Retrieved from Dialog File 16, Acc#: 0020398672.

(Continued)

*Primary Examiner* — Naeem U Haq
(74) *Attorney, Agent, or Firm* — Thomas | Horstemeyer, LLP

(57) ABSTRACT

Systems and methods for generating product image maps are disclosed. An image containing at least one object is received, and the object is extracted to determine whether it corresponds to a product available via an electronic commerce system. An image map can be generated so that a user interface including hyperlinks to the product in the electronic commerce system can be employed.

19 Claims, 10 Drawing Sheets

(56) References Cited

U.S. PATENT DOCUMENTS

2014/0250466 A1\* 9/2014 Lieberkuhn ...... H04N 21/47815
　　　　　　　　　　　　　　　　　　725/60

OTHER PUBLICATIONS

U.S. Appl. No. 12/378,599, filed Feb. 18, 2009, entitled "Method and System for Image Matching.".
U.S. Appl. No. 12/321,235, filed Jan. 16, 2009, entitled "Method and System to Match Images.".
U.S. Appl. No. 11/732,858, filed Apr. 4, 2007, entitled "Method and System for Searching for Information on a Network in Response to an Image Query Sent by a User From a Mobile Communications Device.".

\* cited by examiner

US 10,235,712 B1

GENERATING PRODUCT IMAGE MAPS

CROSS-REFERENCE TO RELATED APPLICATIONS

This application is a continuation of, and claims priority to, co-pending U.S. patent application entitled "GENERATING PRODUCT IMAGE MAPS," filed on Jul. 23, 2010, and assigned application Ser. No. 12/842,088, which is incorporated herein by reference in its entirety.

BACKGROUND

Many images contain products or representations of products. Images are often used in a user interface, such as a network page encoded in an electronic commerce system and transmitted to a client for rendering in a client application. Many images containing representations of products are not interactive in that they do not include hyperlinks or other user interface elements allowing a user to interact with the image to obtain additional information about the depicted products. This can occur often when images are provided by a user and/or affiliate of an electronic commerce system and incorporated in a user interface facilitated by the electronic commerce system.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

In the following discussion, first a general description of the system and its components is provided, followed by a discussion of the operation of the same. Disclosed herein are systems and methods of identifying products that appear in an image and generating an image map describing the location of these products within the image. Embodiments of this disclosure can also generate a user interface that incorporates the image as well as the image map so that a user can interact with the products appearing in such an image. As discussed herein, a product can include any good or service that can be made accessible via an electronic commerce system.

Figure 1:
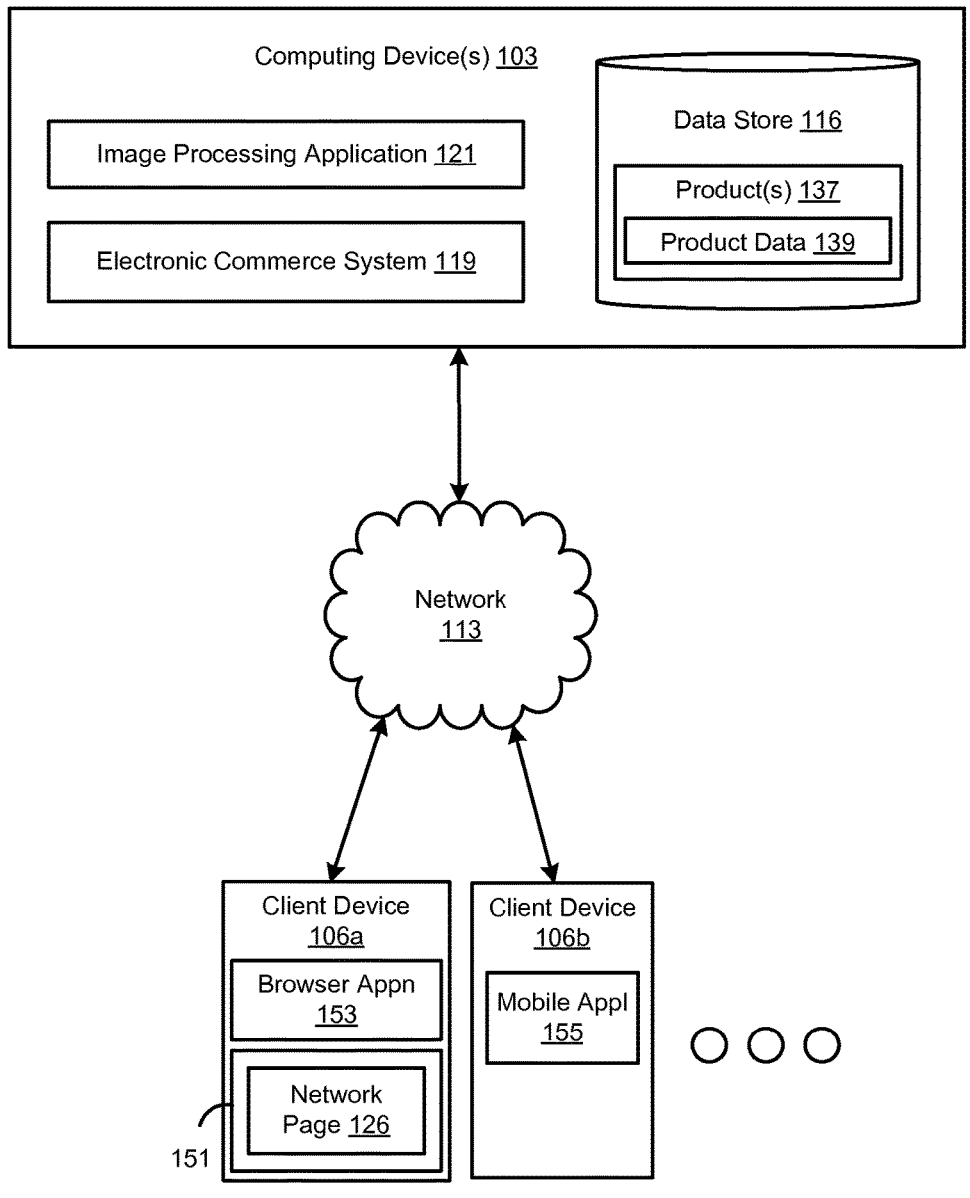
FIG. 1 is a drawing of a networked environment according to various embodiments of the present disclosure.

With reference to FIG. 1, shown is a networked environment 100 according to various embodiments. The networked environment 100 includes at least one computing device 103 in communication with at least data service 105 as well as at least one client device 106a/106b. The network 113 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. As one example, each of the disclosed components executed in the computing device 103 can be executed in different computing devices 103 in various locations in one or more data centers. However, for purposes of convenience, the computing device 103 is referred to herein in the singular. Even though the computing device is referred to in the singular, it is understood that a plurality of computing devices 103 may be employed in the various arrangements as described above.

The components executed on the computing device 103 include, for example, an electronic commerce system 119, an image processing application 121, and other systems, applications, services, processes, engines, or functionality not discussed in detail herein. The electronic commerce system 119 is executed in order to facilitate the viewing and/or purchasing of items and products over the network 113. The electronic commerce system 119 can direct the shipment and/or delivery of products to a customer from a fulfillment center or the like. The electronic commerce system 119 also performs various backend functions associated with the online presence of a merchant in order to facilitate the online purchase of items.

For example, the electronic commerce system 119 generates network pages, such as web pages or other types of network content, that are provided to client devices 106a/106b in response to requests for the purposes of selecting items for purchase, rental, download, lease, or other form of consumption and to perform other tasks as will be described. In other embodiments, the electronic commerce system 119 facilitates the generating of data for display on a user interface rendered by another type of application executed on a client device 106a/106b.

The image processing application 121 facilitates processing images that contain objects that can be identified as products available via the electronic commerce system 119. The image processing application 121 can further generate an image map associated with the image that can describe coordinates in the image where products are located. Accordingly, the electronic commerce system 119 and/or image processing application 121 can generate a user interface for a client device 106a/106b that takes advantage of the image map when displaying a particular image so that the user interface can allow the user to view and/or purchase products depicted in an image.

With regard to the data store 116, the data stored therein can include, for example, a catalog that includes a listing of various products 137 that are available for browsing and/or purchasing within the electronic commerce system 119. The products 137 in the catalog of the data store 116 can also be associated with the product data 139, which can be stored in various forms as can be appreciated. The product data 139 can include stock keeping unit (SKU) identifiers, product imagery (e.g., stock imagery), model numbers, serial numbers, product attributes, product descriptions, other products with which the product is associated, etc. Additionally, the product data 139 can include entries that identify a product class and/or hierarchy in which the product 137 can be classified. The data store 116 can also include other data that may be employed to facilitate an electronic commerce system 119, but such data is not discussed in detail herein. Additionally, it should be appreciated that the data store 116 can be implemented in a separate computing device that may be located in a separate installation or location.

The client device 106a/106b is representative of a plurality of client devices 106a/106b that may be coupled to the network 113. The client device 106a/106b may comprise, for example, a processor-based system such as a computer system. Such a computer system may be embodied in the form of a desktop computer, a laptop computer, a personal digital assistant, a mobile device (e.g. cellular telephone, smart phone, etc.), set-top box, music players, web pads, tablet computer systems, or other devices with like capability. The client device 106a includes a display device 151 upon which various network pages 126 and other content may be rendered.

The client device 106a may be configured to execute various applications such as a browser application 153 and/or other applications. The browser application 153 may be executed in a client device 106, for example, to access and render network pages 126, such as web pages, or other network content served up by the computing device 103 and/or other servers. The client device 106 may be configured to execute applications beyond browser application 153 such as, for example, an email client for receiving email generated by the electronic commerce system 119, instant message applications, an application specifically tailored to access resources of the computing device 103, and/or other applications as can be appreciated. In embodiments of the present disclosure, a user on a client 106a/106b can purchase and/or view products via the electronic commerce system 119 executed by the computing device 103 by manipulating a user interface rendered on the client 106a/106b.

The client device 106b can also include a mobile device on which a browser application 153 and/or a mobile application 155 configured to access the computing device 103 can be executed. The client 106b may comprise a mobile device including cellular telephone, location detection hardware, and software components. The mobile application 155 can comprise a special purpose application tailored to interact with the electronic commerce system 119. As one example, the mobile application 155 can include client side code that enhances a user experience by providing more complex user interface elements and other functionality and facilitates interaction with the electronic commerce system 119.

Next, a general description that provides some examples of the operation of the various components of the networked environment 100 is provided. The following discussion includes non-limiting examples of the identifying of objects within an image as product available in an electronic commerce system 119 as well as generating an image map describing the location of the products within the image. Additionally, embodiments of this disclosure can generate a user interface that takes advantage of such an image map to allow a user to view and/or purchase products in an image by interacting with the image in a user interface.

The image processing application 121 can identify objects depicted in an image and perform various image recognition and/or text recognition techniques in order to identify and delineate the various objects shown in the image. The image processing application 121 can then generate an image map that describes the coordinates of the various objects in an image. The image processing application 121 can also determine whether the objects can be identified as products that are available via an electronic commerce system 119. Accordingly, the electronic commerce system 119 and/or image processing application 121 can generate a user interface for display on a client device 106a/106b that incorporates the image, the image map, and hyperlinks that allow a user to click and/or tap on a representation of the product within the image to view additional information about the product.

Figure 2:
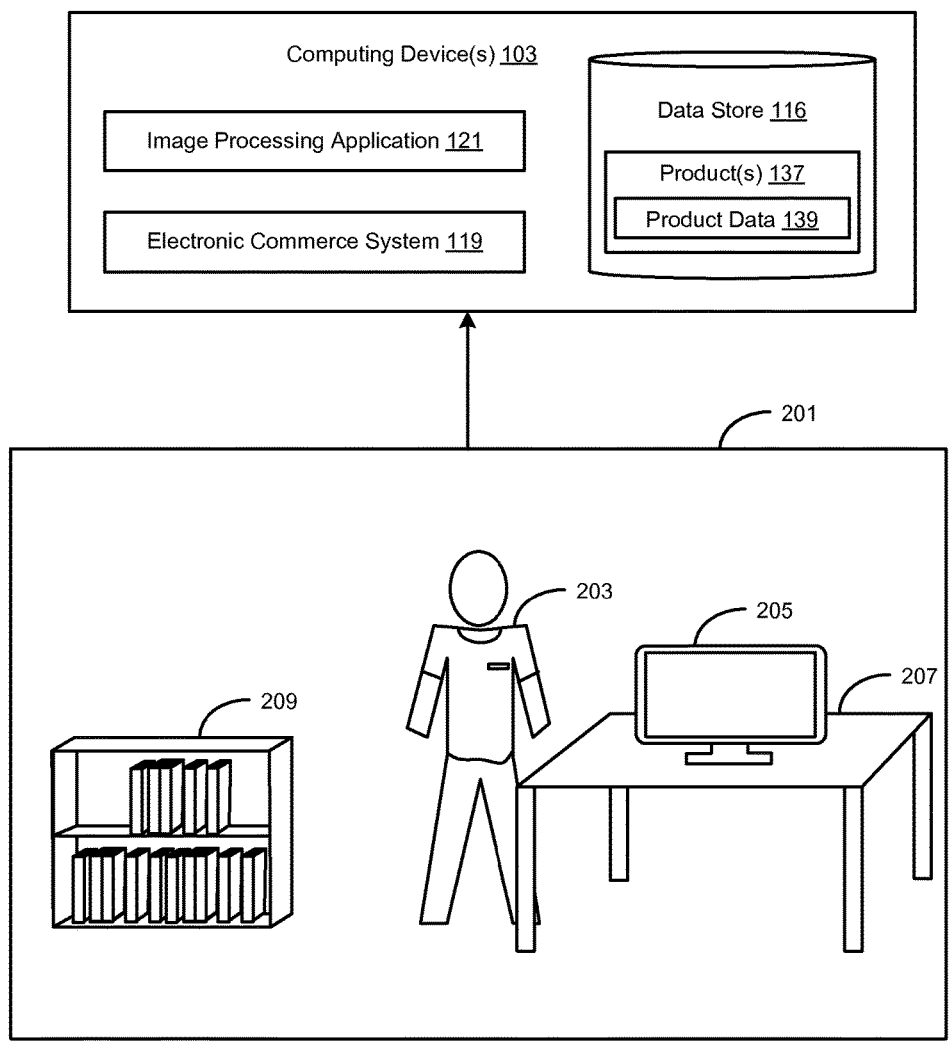
FIG. 2 is a drawing of an example image processed by the image processing application according to various embodiments of the present disclosure.

Accordingly, reference is now made to FIG. 2, which depicts one example of an image 201 that can be processed by the image processing application 121 as described herein. The example image 201 shown in FIG. 2 depicts various objects therein, and the image 201 can be provided to a computing device 103 executing the image processing application 121 so that products associated with one or more of the objects can be identified and an image map generated that describes the location of these products within the image.

In the depicted example, the image 201 contains various objects 203, 205, 207, 209 which the image processing application 121 can identify and perform image recognition and/or text recognition techniques to determine whether the object is associated with a product available via the electronic commerce system 119. The image 201 can be provided by a user of the electronic commerce system 119, an affiliate of the electronic commerce system 119, etc., and the image processing application 121 can process the image as described herein so that the image and a corresponding image map can be employed in a user interface. The image processing application 121 can employ various image recognition and/or text recognition techniques to identify and delineate the various objects from one another in the image 201, and then compare representations of the objects in the image to imagery associated with products 137 available via the electronic commerce system 119.

Various image recognition and/or text recognition techniques that facilitate extracting an object from an image and then associating the image with a product available in an electronic commerce system 119 are disclosed in U.S. patent application Ser. No. 12/321,235 entitled "System and Method to Match Images," filed Jan. 16, 2009, U.S. patent application Ser. No. 11/732,858 entitled "Method and System for Searching for Information on a Network in Response to an Image Query Sent by a User From a Mobile Communications Device," filed Apr. 4, 2007, and U.S. patent application Ser. No. 12/378,599 entitled "Method and System for Image Matching," filed Feb. 18, 2009, each of which is hereby incorporated by reference herein in its entirety.

In one embodiment, an image 201 is provided to the image processing application 121, and the image processing application 121 can attempt to associate the image with a product 137 available via the electronic commerce system 119. In this way, the image processing application 121 can attempt to match the entire image 201 with imagery associated with products 137 in the data store 116. If the image processing application 121 cannot match the image 201 with a product 137 available via the electronic commerce system 119, the image processing application 121 can then attempt to identify and/or extract objects from the image and then attempt to match the extracted objects with imagery associated with products 137 available via the electronic commerce system.

In some embodiments, the image processing application 121 can employ a decision engine that allows one or more users view an image and identify products contained therein. Such a decision engine can facilitate identification of objects within the video as well as products that are associated with the objects. As one example, the image processing application 121 can provide the image 201 to a decision engine to facilitate identification of products in an image 201 that are also available via the electronic commerce system 119. In one embodiment, the decision engine can provide image 201 to at least one user, who can submit a vote to the decision engine regarding products represented therein. Accordingly, the decision engine can aggregate one or more votes from a one or more users and associate an object in the image 201 with a product receiving the highest percentage of votes. The decision engine can also calculate a confidence score associated with a particular identification of a product by a plurality users. Accordingly, the image processing application 121 can be tuned to accept identifications of products in an image 201 that have a confidence score above a predetermined threshold.

Figure 3:
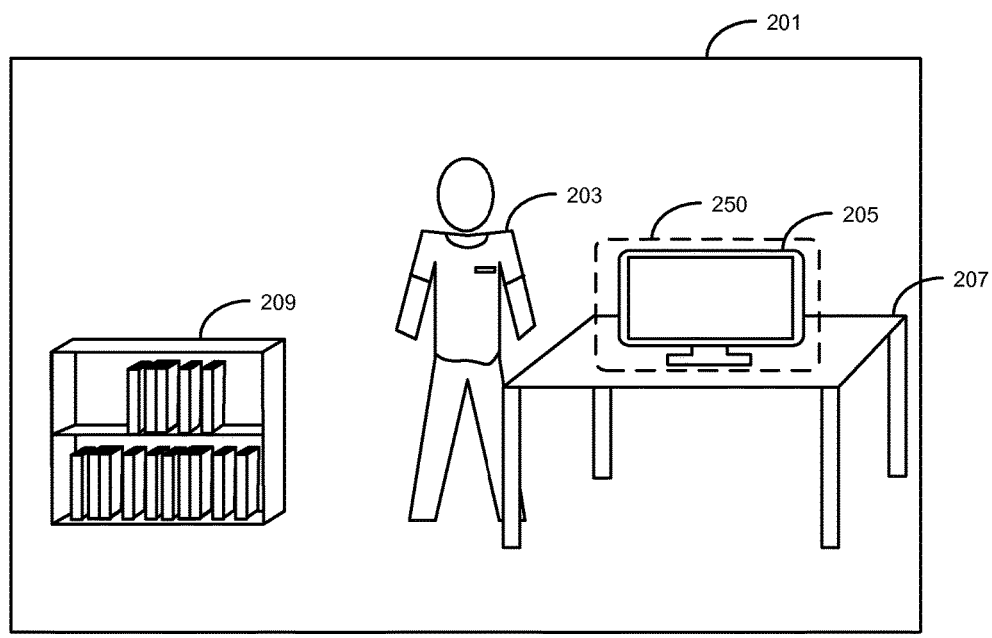
FIGS. 3-8 are drawings of example images processed by the image processing application according to various embodiments of the present disclosure.

Reference is now made to FIG. 3, which illustrates how, in one example, edge recognition techniques can be employed to identify products that are contained in an image 201. In one embodiment, the image processing application 121 can identify an edge associated with an object in the image 201 and extract a region of the image 201 within a perimeter defined by the edge. The image processing application 121 can then attempt to match the region extracted from within the perimeter to imagery associated with a product 137 in the data store 116. In one embodiment, the image processing application 121 can perform image recognition techniques to determine whether a region of the image 201 that is extracted from within a perimeter matches stock imagery stored within product data 139 associated with a product 137. In the depicted example, the image processing application can identify an edge 250 around and/or adjacent to the depicted product 205 and extract a region of the image 201 defined by the edge 250. Accordingly, the image processing application can attempt to match the region extracted from within the edge 250 to imagery associated with a product 137 in the data store 116.

In other embodiments, the image processing application 121 can perform character recognition and identify characters within the image 201 and/or a region of the image 201 and attempt to match the characters with product data 139 associated with a product 137. In some embodiments, the image processing application 121 can receive images 201 as well as corresponding data that identify the edges of objects depicted within the image. In this way, a user can designate the edges of objects within the image 201, and the image processing application 121 can match the objects with products 137 available via the electronic commerce system 119.

Figure 4:
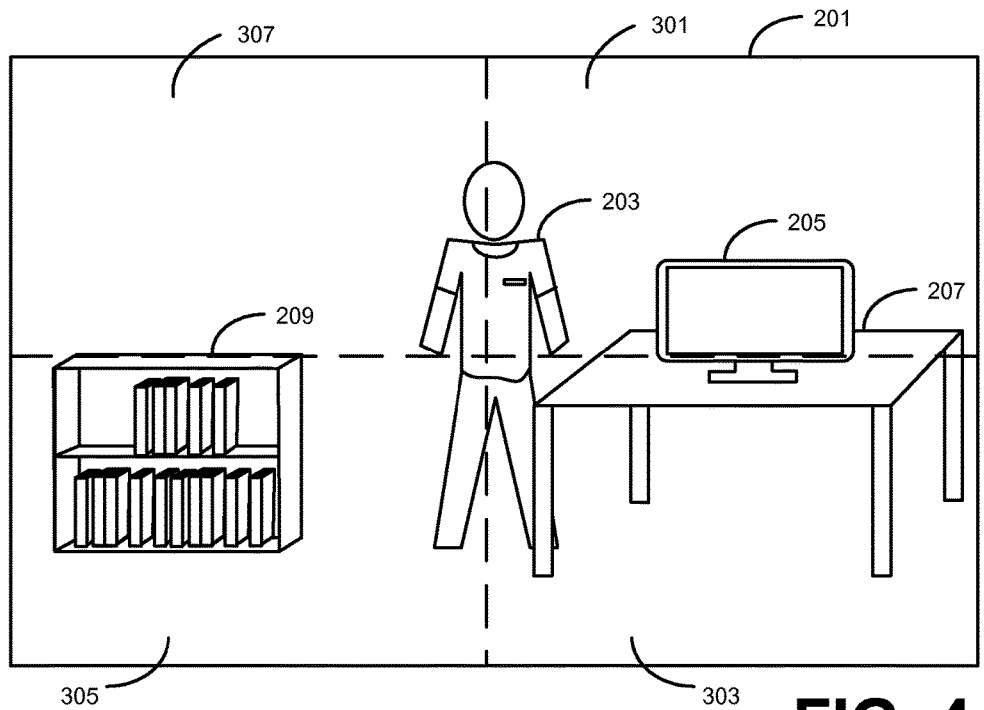

Reference is now made to FIG. 4, which illustrates the splitting of an image 201 into smaller regions in order to identify products that are contained therein. In addition to employing edge recognition techniques, as described above, to detect objects contained within an image 201, the image processing application 121 can also divide the image 201 into smaller regions until objects that can be associated with products 137 available via the electronic commerce system 119 can be identified. In one embodiment, before dividing the image 201 into smaller regions, the image processing application 121 can identify objects in the image 201 and associate identifiable objects with products 137, and then divide the image 201 into smaller regions so that the image processing application 121 can perform image recognition on the smaller regions individually. In this way, the image processing application 121 can remove "noise" associated with certain objects and/or products 137 that may be represented in an image 201 that can negatively affect recognition of some objects in the image 201.

In the depicted non-limiting example, the image processing application 121 may be able to identify a product 137 associated with the object 203, but may be unable to identify the remaining objects 205, 207, 209 because there may be too many other objects represented in the image 201 when the image 201 is analyzed at its full size. Accordingly, the image processing application 121 can successively divide the image 201 into smaller regions and analyze these smaller regions until the remaining objects 205, 207, 209 in the image 201 can be identified and either associated with a product 137 available via the electronic commerce system 119 or until they can be identified as objects that cannot be associated with a product 137.

In one embodiment, the image processing application 121 can divide the image 201 in half and then attempt to identify objects in each half of the image 201. The image processing application can continue successively dividing the image 201 in half and continue attempts to identify objects in the image 201 and associated them with products 137 available via the electronic commerce system 119. FIG. 3 depicts an example according to this non-limiting image processing scheme after the image processing application 121 has divided the image 201 in half twice. In the depicted example, prior to dividing the image 201 into smaller regions 301, 303, 305, 307, the image processing application may have been able to identify a product associated with the object 203, which can be an apparel item. However, the image processing application 121 may have been unable to identify the remaining objects and/or associated products. Accordingly, the image processing application 121 can analyze each of the smaller regions 301, 303, 305, 307.

The image processing application 121 may now be able to resolve object 205 in region 301 by analyzing the region 301 without the remaining portion of the image 201. Additionally, the image processing application 121 may be able to associate the object 205 with a product 137 available via the electronic commerce system 119. The image processing application 121 may additionally be able to associate object 207 with a different product 137 available via the electronic commerce system 119. Upon dividing the image 201 into halves twice, as in the depicted example of FIG. 3, the image processing application 121 may still be unable to identify products within object 209.

Figure 5:
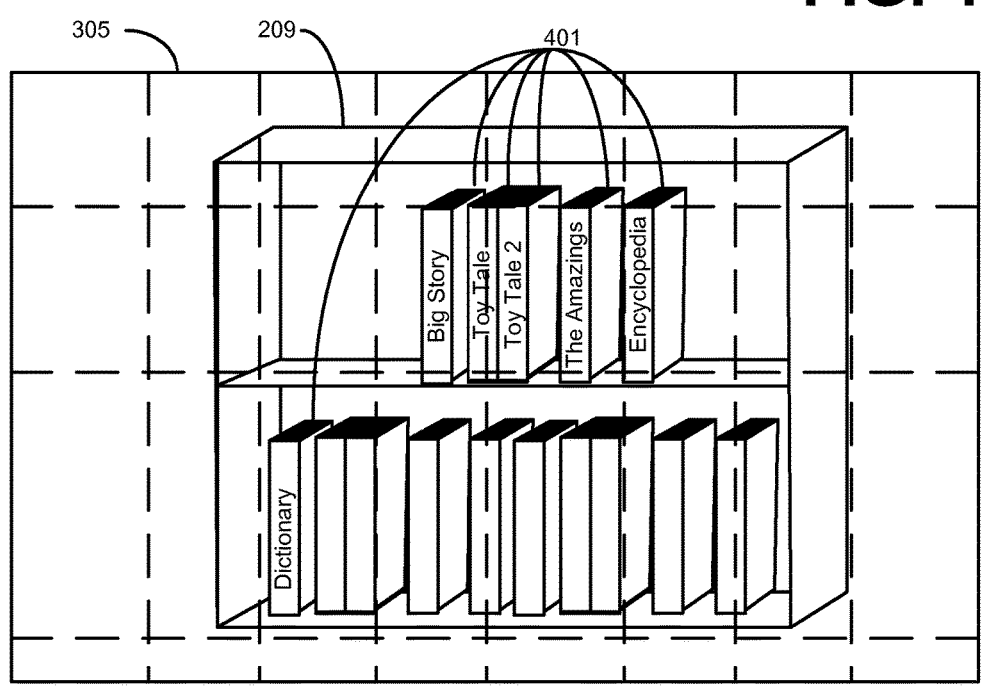

Accordingly, reference is now made to FIG. 5, which continues the example of FIG. 3, and depicts region 305 (FIG. 3) of the image 201 being successively divided into smaller regions until the image processing application 121 can identify objects within the region 305 and either associate these objects with products 137 available via the electronic commerce system 119 or identify the objects do not correspond to products 137 that are available via the electronic commerce system 119. In the depicted example, region 305 of the image 201 contains various objects 401 that are in relative close proximity to one another. Accordingly, the image processing application 121 may successively divide the image 201 into smaller regions and perform image recognition and/or character recognition techniques on the smaller regions to determine whether they correspond to products 137 available via the electronic commerce system 119.

The image processing application 121 can perform a combination of various techniques in order to identify products 137 contained within an image. As noted above, the image processing application 121 can identify edges associated with the objects in an image as well as divide the image successively into smaller regions in order to identify products associated with the objects. Additionally, the image processing application 121 can also analyze an image by identifying at least one point within the image and then extract and analyze a region around the one or more points to identify products in the image. The image processing application 121 can then successively expand the region around the one or more points until the entire image is analyzed. In another embodiment, the image processing application 121 can request one or more users or a community to designate objects and/or identify the edges of objects contained within an image, and then associate these objects with products 137 available via the electronic commerce system 119. Other variations and combinations of the above should be appreciated.

Figure 6:
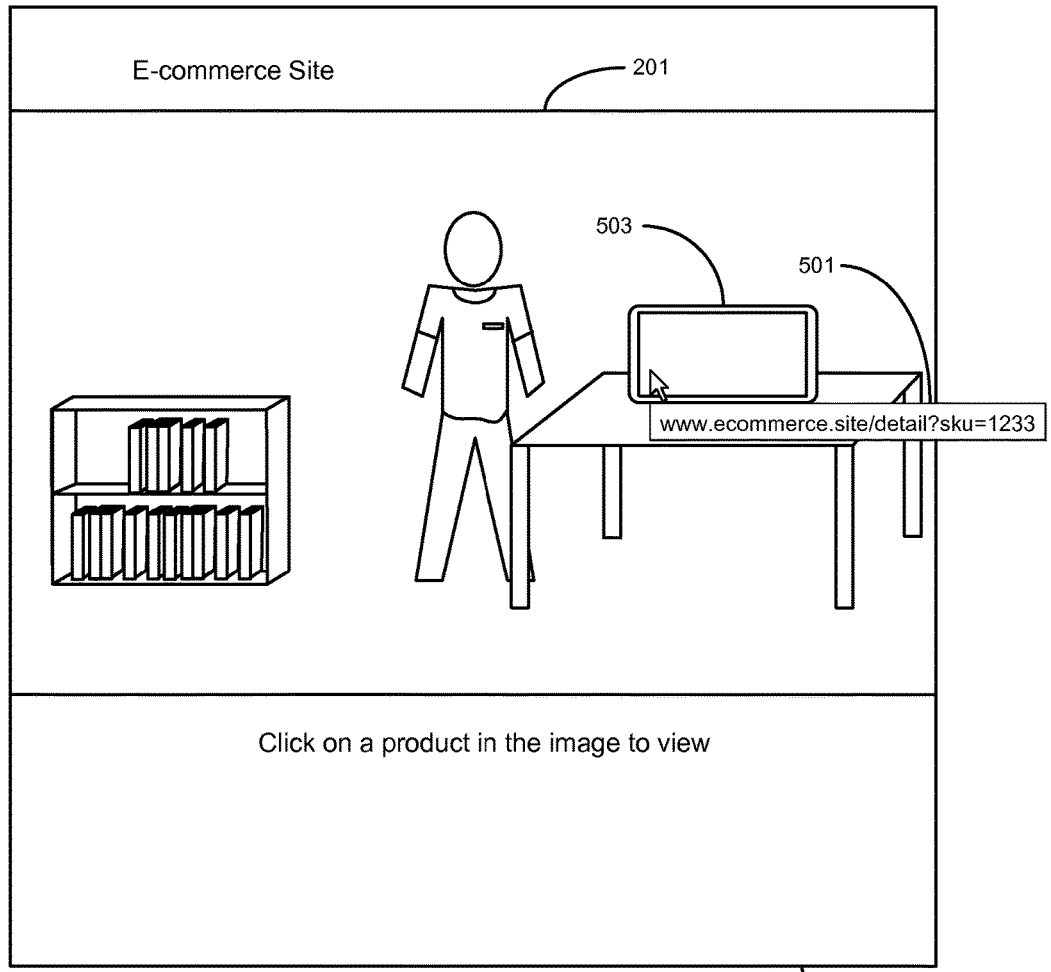

Reference is now made to FIG. 6, which depicts an example of a user interface generated by the electronic commerce system 119 that can be rendered on a client device 106*a*/106*b* according to an embodiment of this disclosure. In the depicted non-limiting example, the user interface can comprise a network page 126 that is rendered by a browser application 153 executed on a client device 106*a*. In another embodiment, the user interface can comprise an image viewer in a mobile application 155 executed on a client device 106*b* that is a mobile device. As noted above in reference to FIGS. 2-4, the image processing application 121 can identify products that are depicted in an image. The image processing application 121 can also generate an image map that describes the location within the image of the various products that are identified.

Accordingly, an image map that is generated by the image processing application 121 can be employed in conjunction with the image in a user interface that allows the user to interact with the image in order to purchase and/or view products that are available via the electronic commerce system 119. In one embodiment, the image map can be translated into a hypertext markup language (HTML) and/or extensible hypertext markup language (XHTML) representation, and hyperlinks to a product detail page or a purchasing user interface can be associated with coordinates in which a product is located within the image.

In this way, a user can view an image as well as follow hyperlinks facilitated by the image map to purchase and/or view additional information about the products shown therein. In the depicted example, a hyperlink 501 associated with the depicted product 503 can be embedded in the network page 126 and associated with the location of the product 503 within the image 201. Accordingly, if a user moves an input device over an image or taps a location on a screen above an image, the client device 106*a*/106*b* rendering the depicted network page 126 can reveal a link to another user interface that can display additional information about the product 503 and/or allow the user to purchase the product 503.

Figure 7:
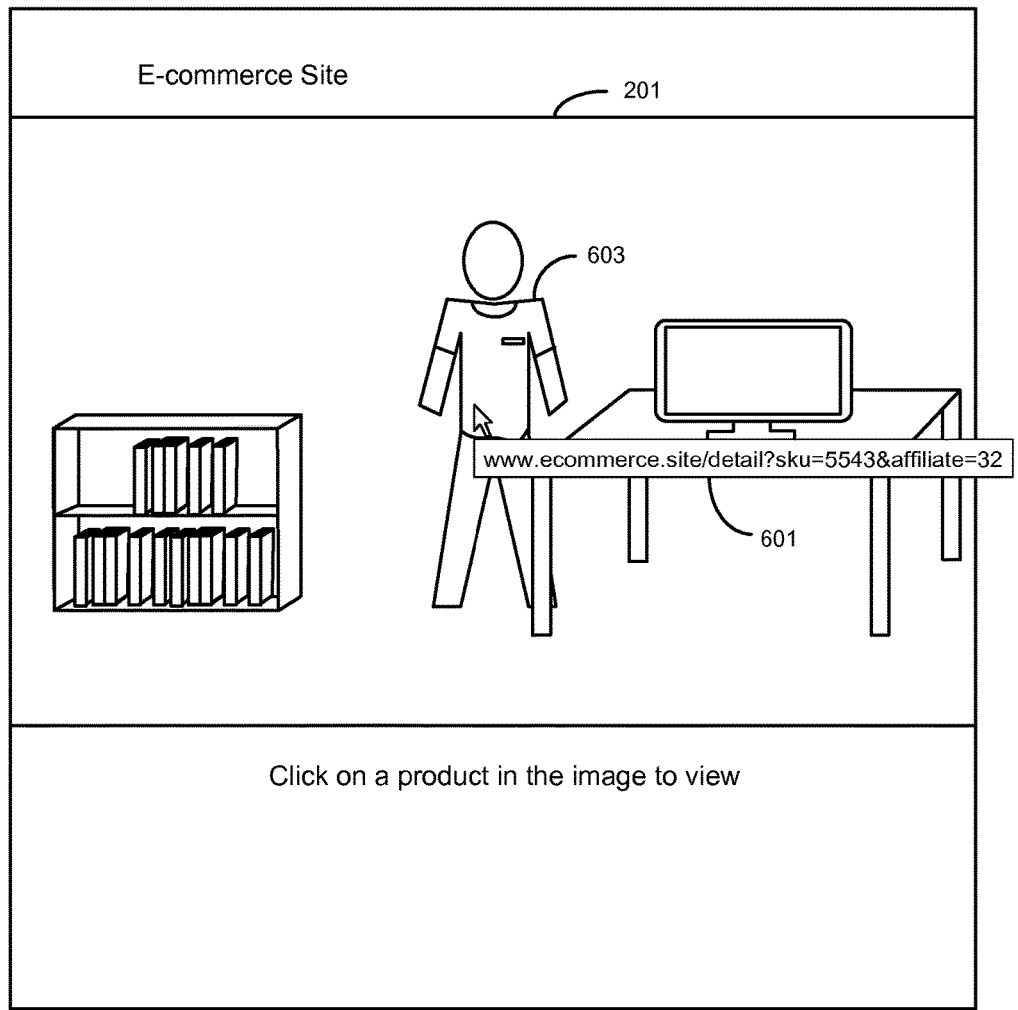

Continuing the example of FIG. 6, reference is now made to FIG. 7, which depicts an alternative user interface generated by the electronic commerce system 119 that is facilitated by an image map generated by the image processing application 121. In the depicted non-limiting example, the user interface generated by the electronic commerce system 119 is a network page 126 that incorporates an image 201 analyzed by the image processing application 121 and an image map that describes the location of products within the image 201. FIG. 6 illustrates how a different hyperlink 601 can be associated with a different product 603 shown within the image 201 rendered in the network page 126. Additionally the hyperlink 601 can include an affiliate code that can reference an entity providing the image to the image processing application 121 and/or the electronic commerce system 119.

Figure 8:
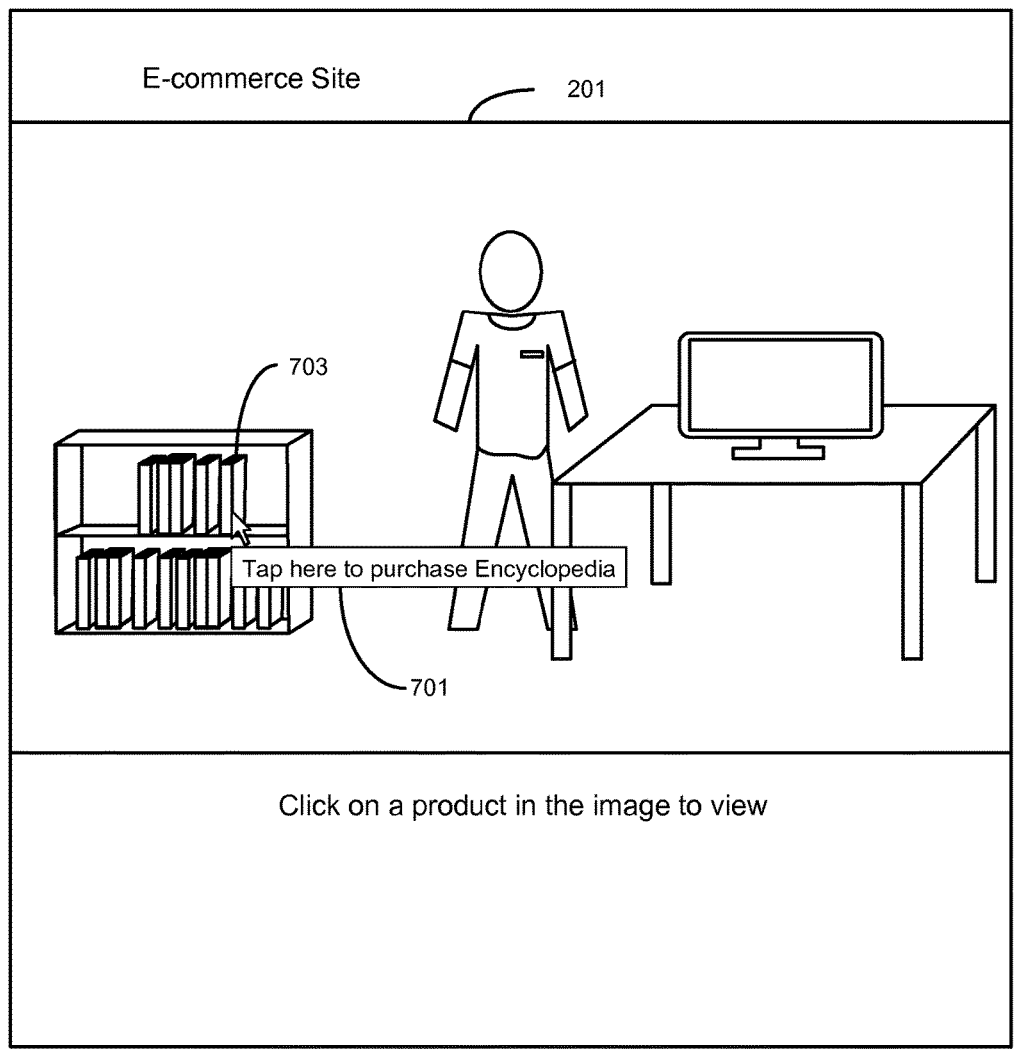

Continuing the example user interface of FIGS. 6 and 7, reference is now made to FIG. 8, which depicts an example user interface (e.g., a network page 126) rendered on a client device 106*a*/106*b*. FIG. 8 illustrates a user interface that can incorporate client side code so that additional information about a product and/or other data can be displayed when a user hovers a mouse pointer or other input device over a product 703 shown within an image 201 in the network page 126.

Figure 9:
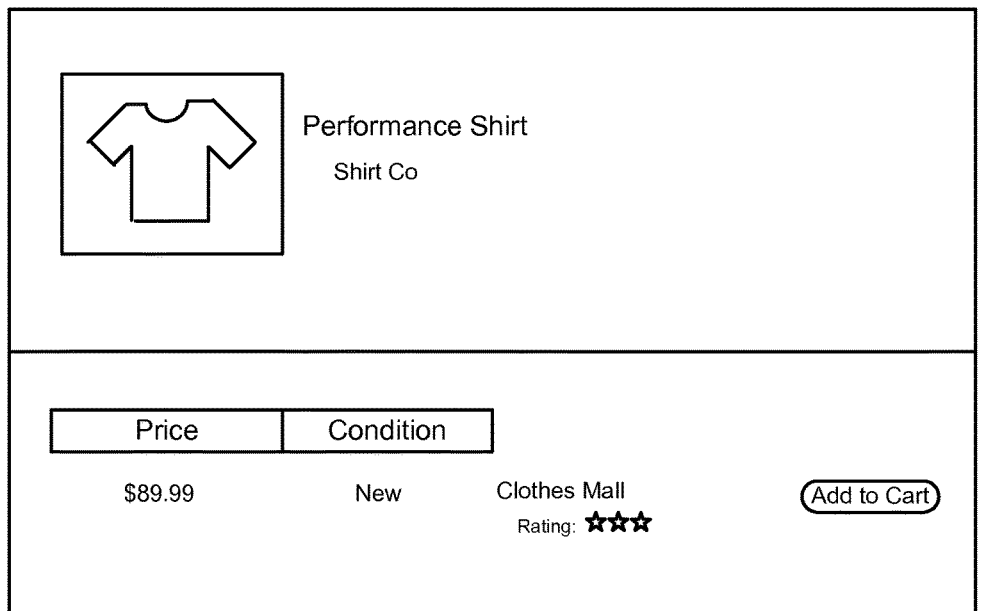
FIGS. 9-10 are drawings of example of user interfaces rendered by a client in the networked environment of FIG. 1 according to various embodiments of the present disclosure.
Figure 10:
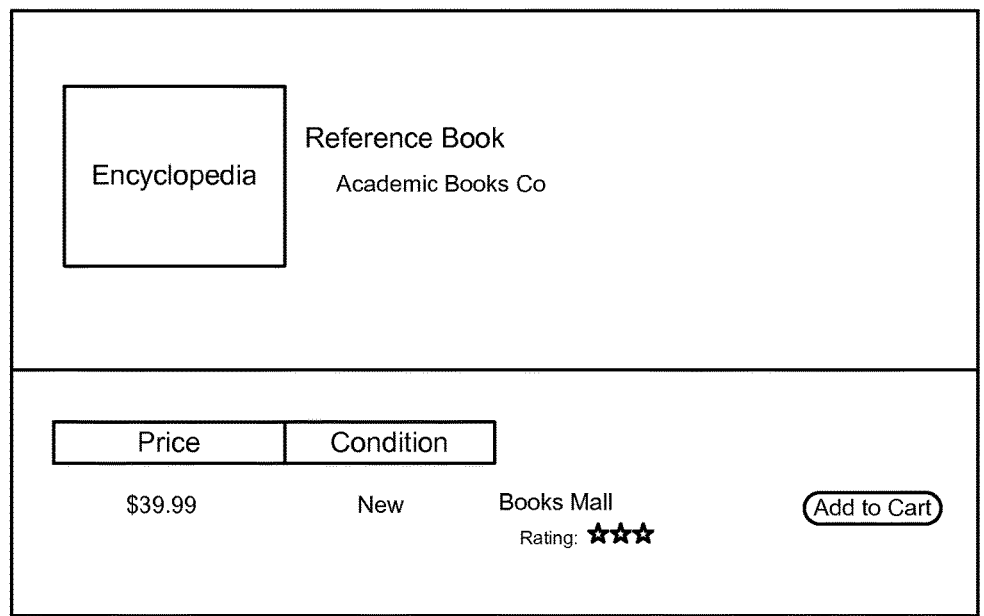

Reference is now made to FIG. 9, which depicts network page 126 in which product details are shown. The product detail page shown in FIG. 9 depicts a product corresponding to the product 603 (FIG. 7) identified in the image 201. Accordingly, an image map generated by the image processing application 121 can be incorporated into a user interface with a hyperlink to the depicted product detail page so that when a user on a client device 106*a*/106*b* interacts with the product 603 in the user interface of FIG. 7, the electronic commerce system 119 can generate the depicted product detail page and transmit such a user interface to the client device 106*a*/106*b*. Additionally, FIG. 10 depicts an alternative example of a network page 126 that can be generated by the electronic commerce system 119 when a user follows a hyperlink incorporated in the user interface depicted in FIG. 7.

Figure 11:
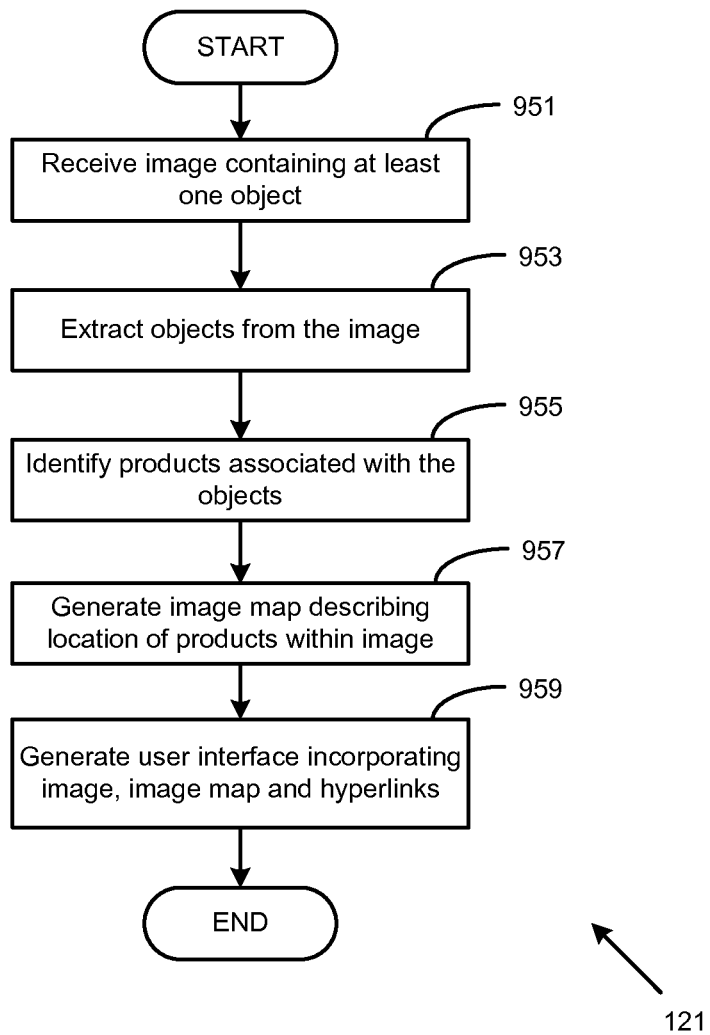
FIG. 11 is a flowchart illustrating one example of functionality implemented as portions of the image processing application executed in a computing device in the networked environment of FIG. 1 according to various embodiments of the present disclosure.

With reference to FIG. 11, shown is a flowchart that provides one example of the operation of various embodiments of the image processing application 121 according to various embodiments. It is understood that the flowchart of FIG. 11 merely provides examples of the many different types of functional arrangements that may be employed to implement the operation of the image processing application 121 as described herein. As an alternative, the flowchart of FIG. 11 may be viewed as depicting examples of steps of methods implemented in the computing device 103 (FIG. 1) according to one or more embodiments.

With specific reference to FIG. 11, beginning with box 951, the image processing application 121 receives an image that contains at least one object. In box 953, the image processing application 121 extracts the objects from the image. As noted above, the image processing application 121 can perform image recognition and/or text recognition techniques in order to identify objects in the image. Accordingly, in box 955, the image processing application 121 can identify products available via an electronic commerce system 119 that are associated with the objects. In one example, the image processing application 121 can attempt to match an object in the image with imagery associated with a product. In another example, the image processing application 121 can perform text recognition techniques to identify textual artifacts in the image and attempt to match the text with textual data associated with the product. In box 957, the image processing application 121 can generate an image map that describes the location of products within the image, and in box 959, a user interface can be generated that incorporates the image into the user interface as well as hyperlinks associated with the location of the products in the image.

Figure 12:
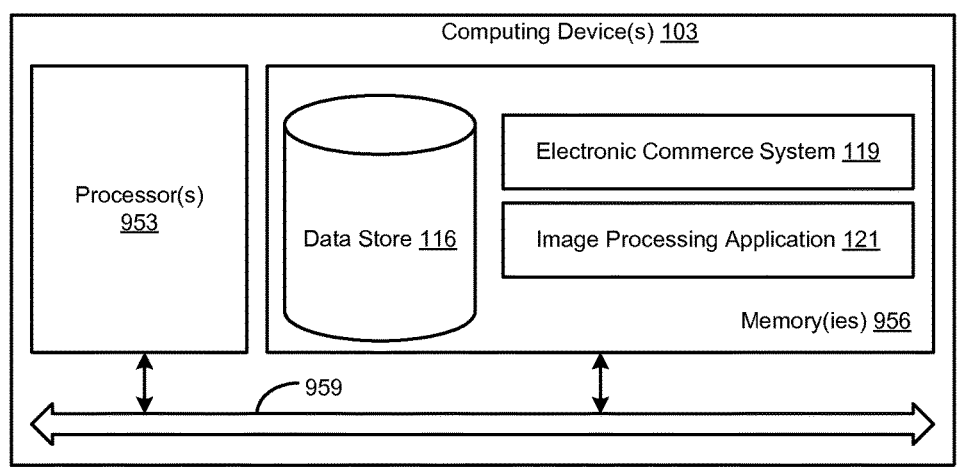
FIG. 12 is a schematic block diagram that provides one example illustration of a computing device employed in the networked environment of FIG. 1 according to various embodiments of the present disclosure.

With reference to FIG. 12, shown is a schematic block diagram of the computing device 103 according to an embodiment of the present disclosure. The computing device 103 includes at least one processor circuit, for example, having a processor 953 and a memory 956, both of which are coupled to a local interface 959. To this end, the computing device 103 may comprise, for example, at least one server computer or like device. The local interface 959 may comprise, for example, a data bus with an accompanying address/control bus or other bus structure as can be appreciated.

Stored in the memory 956 are both data and several components that are executable by the processor 953. In particular, stored in the memory 956 and executable by the processor 953 are the image processing application 121, and potentially other applications. Also stored in the memory 956 may be a data store 116 and other data. In addition, an operating system may be stored in the memory 956 and executable by the processor 953.

It is understood that there may be other applications that are stored in the memory 956 and are executable by the processors 953 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 956 and are executable by the processor 953. In this respect, the term "executable" means a program file that is in a form that can ultimately be run by the processor 953. Examples of executable programs may be, for example, a compiled program that can be translated into machine code in a format that can be loaded into a random access portion of the memory 956 and run by the processor 953, source code that may be expressed in proper format such as object code that is capable of being loaded into a random access portion of the memory 956 and executed by the processor 953, or source code that may be interpreted by another executable program to generate instructions in a random access portion of the memory 956 to be executed by the processor 953, etc. An executable program may be stored in any portion or component of the memory 956 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 956 is defined herein as including both volatile and nonvolatile memory and data storage components. Volatile components are those that do not retain data values upon loss of power. Nonvolatile components are those that retain data upon a loss of power. Thus, the memory 956 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 953 may represent multiple processors 953 and the memory 956 may represent multiple memories 956 that operate in parallel processing circuits, respectively. In such a case, the local interface 959 may be an appropriate network 113 (FIG. 1) that facilitates communication between any two of the multiple processors 953, between any processor 953 and any of the memories 956, or between any two of the memories 956, etc. The local interface 959 may comprise additional systems designed to coordinate this communication, including, for example, performing load balancing. The processor 953 may be of electrical or of some other available construction.

Although the image processing application 121 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 11 shows the functionality and operation of an implementation of portions of the image processing application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 953 in a computer system or other system. The machine code may be converted from the source code, etc. If embodied in hardware, each block may represent a circuit or a number of interconnected circuits to implement the specified logical function(s).

Although the flowchart of FIG. 11 shows a specific order of execution, it is understood that the order of execution may differ from that which is depicted. For example, the order of execution of two or more blocks may be scrambled relative to the order shown. Also, two or more blocks shown in succession in FIG. 10 may be executed concurrently or with partial concurrence. Further, in some embodiments, one or more of the blocks shown in FIG. 11 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the image processing application 121, that comprises software or code can be embodied in any non-transitory computer-readable medium for use by or in connection with an instruction execution system such as, for example, a processor 953 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

For the Examiner's convenience, Applicants note that this application is a continuation of U.S. application Ser. No. 12/842,088. The claims of the present application are different and possibly, at least in some aspects, broader in scope than the claims pursued in the parent application. To the extent any prior amendments or characterizations of the scope of any claim or cited document made during prosecution of the parent could be construed as a disclaimer of any subject matter supported by the present disclosure, Applicants hereby rescind and retract such disclaimer. Accordingly, the references previously presented in the parent applications may need to be revisited.

Therefore, the following is claimed:

1. A system, comprising:
   at least one computing device; and
   an image processing application executable in the at least one computing device, the image processing application, when executed, causing the at least one computing device to at least:
   obtain an image depicting at least one object, the at least one object representing at least one product available in an electronic commerce system;
   extract the at least one object from the image;
   identify the at least one product associated with the at least one object by identifying the at least one object within the image, performing image recognition with respect to the object and comparing a result of the image recognition with product imagery associated with a plurality of products available via the electronic commerce system;
   detect a perimeter associated with the at least one object in the image;
   extract a respective region of the image within the perimeter of the at least one object,
   associate the respective region of the image with the at least one product; and
   generate an image map corresponding to the image, the image map specifying at least one set of coordinates in the image associated with a location of the at least one product in the image.

2. The system of claim 1, wherein the image processing application identifies the at least one product by at least:
   performing character recognition with respect to the at least one object; and
   comparing a result of the character recognition with at least one text field associated with the plurality of products available via the electronic commerce system.

3. The system of claim 1, wherein the image processing application identifies the at least one product by at least transmitting the object to a decision engine, the decision engine configured to receive at least one vote from a user, the at least one vote selecting an identity of the at least one product from the plurality of products available via the electronic commerce system.

4. The system of claim 3, wherein the image processing application identifies the at least one product by at least:
   dividing the image into a plurality of smaller images in response to a failure to identify the at least one product; and
   performing the image recognition with respect to the plurality of smaller images.

5. The system of claim 1, wherein the image processing application, when executed, further causes the at least one computing device to generate a user interface incorporating the image, the image map being associated with the image in the user interface, the image map further describing at least one link associated with the at least one set of coordinates at which the at least one product is located.

6. The system of claim 5, wherein the link is associated with a product detail page generated by the electronic commerce system, the product detail page facilitating purchase of the at least one product.

7. The system of claim 5, wherein the link further comprises an affiliate code associated with an electronic commerce system affiliate.

8. The system of claim 5, wherein the image processing application, when executed, further causes the at least one computing device to at least:
   generate a hypertext markup language (HTML) representation of the image map; and
   embed the HTML representation of the image map in an HTML user interface.

9. The system of claim 1, wherein the image processing application identifies the at least one product by at least:
   identifying a point within the image;
   identifying a region around the point within the image; and
   successively expanding the region until the at least one product can be identified within the region.

10. A method, comprising:
obtaining, by at least one computing device, an image depicting at least one object, the at least one object representing a product available in an electronic commerce system;
identifying, by the at least one computing device, the product associated with the at least one object by performing image recognition with respect to the at least one object and comparing a result of the image recognition with product imagery obtained from the electronic commerce system,
detecting a respective perimeter associated with the at least one object in the image;
extracting a respective region of the image within the respective perimeter of the at least one object;
associating the respective region of the image with the product; and
generating, by the at least one computing device, an image map corresponding to the image, the image map specifying a set of coordinates in the image at which the product is located.

11. The method of claim 10, wherein identifying the product further comprises:
performing, by the at least one computing device, character recognition with respect to the object; and
comparing, by the at least one computing device, a result of the character recognition with at least one text field associated with a plurality of products available via the electronic commerce system.

12. The method of claim 10, further comprising encoding for display a user interface incorporating the image, the image map being associated with the image in the user interface and specifying at least one link associated with the set of coordinates, the at least one link referencing a second user interface associated with the product in the electronic commerce system.

13. The method of claim 12, wherein the second user interface is a product detail page generated by the electronic commerce system, the product detail page comprising at least one user interface element facilitating purchase of the product.

14. The method of claim 12, wherein the link comprises an affiliate code associated with an electronic commerce system affiliate.

15. The method of claim 12, further comprising generating at least one user interface element that displays data associated with the product upon detection of a user interaction with the image at the set of coordinates.

16. The method of claim 10, wherein identifying the product further comprises:
determining whether the product can be identified in the image; and
dividing the image into a plurality of smaller images and analyzing individual ones of the smaller images to identify the product when the product cannot be identified in the image.

17. A non-transitory computer-readable medium embodying a program executable in a computing device, the program, when executed, causing the computing device to at least:
identify a product associated with an object depicted in an image by performing image recognition on the object and comparing a result of the image recognition against product imagery associated with the product available in an electronic commerce system,
detect a respective perimeter associated with the object in the image;
extract a respective region of the image within the respective perimeter of the object,
associate the respective region of the image with the product;
generate an image map corresponding to the image, the image map specifying a set of coordinates associated with a location of the product depicted in the image; and
generate a user interface incorporating the image, the user interface comprising the image map and specifying a link associated with the product to be provided at the location associated with the set of coordinates, the link referencing a second user interface associated with the product in the electronic commerce system.

18. The non-transitory computer-readable medium of claim 17, wherein the program identifies the product by at least:
performing character recognition with respect to the object; and
comparing a result of the character recognition with at least one text field associated with a plurality of products available via the electronic commerce system.

19. The non-transitory computer-readable medium of claim 17, wherein the program identifies the product by at least successively dividing the image into a plurality of smaller images and performs image recognition with respect to each of the smaller images until the product is be identified in at least one of the plurality of smaller images.

* * * * *